United States Patent [19]

Ellingson

[11] 4,223,311
[45] Sep. 16, 1980

[54] LONG RANGE LISTENING SYSTEM

[75] Inventor: Herman E. Ellingson, Silver Spring, Md.

[73] Assignee: The United States of America as represented by the Secretary of the Navy, Washington, D.C.

[21] Appl. No.: 568,681

[22] Filed: Feb. 29, 1956

[51] Int. Cl.³ .............................................. G01S 3/02
[52] U.S. Cl. ............................................... 343/112 D
[58] Field of Search ................ 340/6, 16, 3, 3 R, 6 R, 340/16 R; 235/61 CF; 343/100.7, 120, 112 D; 324/83

[56] References Cited

U.S. PATENT DOCUMENTS

| | | | |
|---|---|---|---|
| 2,349,370 | 5/1944 | Orner | 340/16 R |
| 2,523,398 | 9/1950 | Southworth | 343/112 D |
| 2,932,002 | 4/1960 | Keiser | 340/6 R |

*Primary Examiner*—Theodore M. Blum
*Attorney, Agent, or Firm*—R. S. Sciascia; A. L. Branning

EXEMPLARY CLAIM

1. A system for locating the position of an energy radiating source comprising three radiated energy receiving means arranged in predetermined substantially linear spaced positions and each producing an output signal in response to energy received thereby, a plurality of individual signal clipping means respectively connected to each of said receiving means for limiting the characteristics of said output signal therefrom to the instantaneous polarity of said signal, means connected to the respective signal clipping means for effecting polarity correlation between the clipped output signals of a predetermined pair of signal receiving means, electrical means serially connected between said receiving means and said correlation means for selectively introducing a delay of the signal from at least one signal receiving means sufficient to maximize the polarity correlation of said signals, said electrical delay means being calibrated to give the bearing to said source, a second means for effecting polarity correlation, the third energy receiving means being positioned intermediate and in aligned spaced relation to said predetermined pair of energy receiving means when the signals of said pair are in maximum polarity correlation, an additional electrical delay means connected between the third receiving means and said second means for maximizing polarity correlation between the clipped signals from the three receiving means, said additional electrical delay means being calibrated to indicate the range to said source when the clipped signals of said three receiving means are in maximum polarity correlation.

1 Claim, 3 Drawing Figures

LONG RANGE LISTENING SYSTEM

The invention described herein may be manufactured and used by or for the Government of the United States of America for governmental purposes without the payment of any royalties thereon or therefor.

The present invention relates to a system for locating and determining the range to a source of vibration. More particularly, this invention relates to a method and apparatus using correlation techniques in determining the direction and range of a source of sound.

Previous devices for determining the direction and distance to a source sound or for locating objects have been of several types. In general, such previous devices have been characterized by the use of triangulation techniques for determining the direction and range to objects or to sources of sound. Also most of the prior art devices are amplitude sensitive and are therefore unable to distinguish the desired signal from local and ambient noise. Many of the prior art devices of this type also have disadvantages resulting from the distortions introduced into transmission of the vibration from the desired source by thermal and other discontinuities in the transmitting medium.

The present invention avoids these difficulties by utilizing the correlation of the polarities of the vibrations received from at least two receiving elements. Polarity for the purposes of this application is defined as a variation of the energy level about a reference level. The variation to an energy level higher than the reference level is considered as having a positive polarity and the variation below the reference level is considered as having a negative polarity. Since the operation of the invention is dependent on the polarity correlation of the received vibrations and not on their amplitudes, distortions in the received vibrations do not affect the reliability of the data received as long as substantially the same distortion is present at all the receivers. Furthermore, since the ambient and local noises are generally of a random nature, the use of correlation techniques tend to eliminate these disturbing elements from consideration in the system.

One of the objects of the present invention is to provide a system for determining the bearing and range to a source of vibration.

It is another object of this invention to provide a passive system for determining range and bearing to a source of vibration.

It is another object to use polarity correlation techniques in the determination of range and bearing to a particular source of vibration.

Other objects and advantages of the invention will hereafter be more fully apparent from the following description taken in connection with the annexed drawings which illustrate an embodiment, and wherein.

Figure 1:
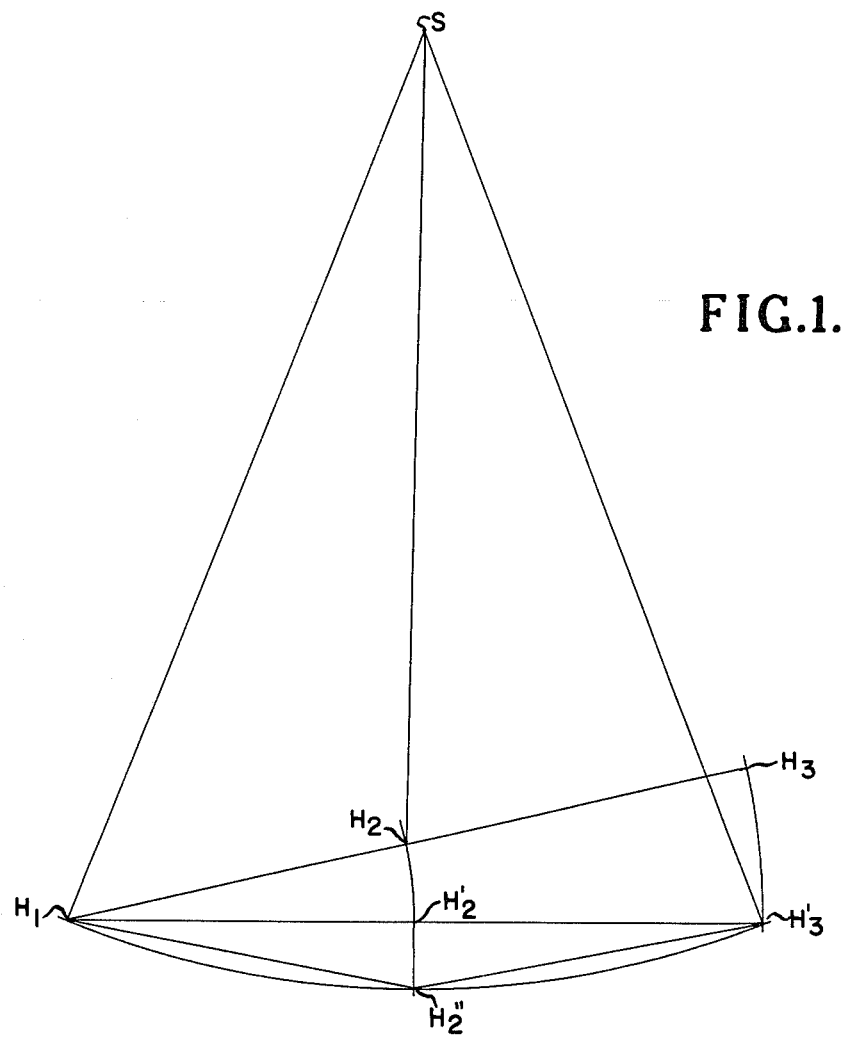
FIG. 1 is a diagram of the geometry involved in the solution of the range and bearing problem.

Referring now to FIG. 1 in connection with a description of the problem, there is assumed to be a source of vibration at point S. The frequency spectrum of this vibration may lie within the range known as noise and may be of the nature of a sound produced by an underwater craft or submarine engine. For the purposes of this application, vibrations from such a source may be called a signal. The system of the present invention may be considered as consisting of a plurality of receiving elements positioned in spaced relation along a line having a known direction with each of the receiving elements having associated therewith means for displacing it relative to the other receiving elements, and means associated with the receiving elements in combination to indicate the maximum correlation between polarities of the signal outputs from the combined receivers together with means for indicating the amount of displacement required to maximize the correlation. More specifically, the system of the present invention may consist of mounting three transducers or other vibration receiving devices in substantially the same horizontal line with the intermediate transducer being equally spaced from the two end transducers. A slight vertical displacement of the transducers from the horizontal plane may be tolerated without introducing appreciable error into the system.

For the sake of explaining the problem, the transducers will first be assumed initially to have the positions H1, H2, and H3 as shown in FIG. 1. In the solution of the present problem it is necessary that the transducers be adjusted so that the source of the vibration or the noise signal will lie on the perpendicular bisector of the line joining the three transducers. It may therefore be necessary to rotate the line joining H1 and H3 about a point for example, H1, giving the line from H1 to H'3. Such a rotation may be accomplished either by physically moving the transducers or, as in a preferred form of the present invention, by introducing electrical delays into the circuits associated with the transducers for simulating movement of the detectors. The position of the transducer at H'3 in relation to its original position at H3 is determined in the present invention by determining when the hydrophones at H1 and H'3 are receiving energy from the same wave front of the sound or other type of vibration emitted from source S. This determination is accomplished by establishing the correlation between the signals received at H1 and the signals received at H'3. The amount of the electrical delay required to be introduced into the circuit of the hydrophone at H3 to maximize the correlation between the signals received at H1 and at H'3 becomes a measure of the bearing to the source of vibration S.

The next consideration from a philosophical point of view in explaining the problem is that of determining the range from the transducers to the source S. This step involves the establishment of a three polarity correlation by the displacement of the transducer at H2. Since the transducer at H2 was in an initial position midway between H1 and H3, it can be effectively displaced from position H2 in FIG. 1 to the position H'2 by the introduction of a delay equal to one half the delay introduced in the circuit of the transducer at H3, this, in effect, maintains the transducers at H1, H'2 and H'3 in substantially the same line as a starting point for the range determination. The step of determining the range is accomplished by determining the amount of delay required to be introduced into the circuit of this H'2, which, in effect, moves the transducer from the position H'2 to the position H''2. The position H''2 is determined by establishing the correlation between the signals received at H1, H''2 and H'3. These signals are correlated and adjusted to maximize the correlation and thus establish that transducer H''2 also lies on the wave front of the signal originating at S. The amount of delay which was required to move the transducer at H2 from the position H'2 to H"2 now becomes a measure of the range from the transducer at H"2 to the source of sound as can be shown mathematically.

In practice, the delay introduced into the circuit of the transducer at H2 moves the effective position of H2 to H"2. The range is determined by subtracting from this amount of delay one half of the delay introduced to effect the movement of the transducer at H3 from position H3 to position H'3.

Figure 2:
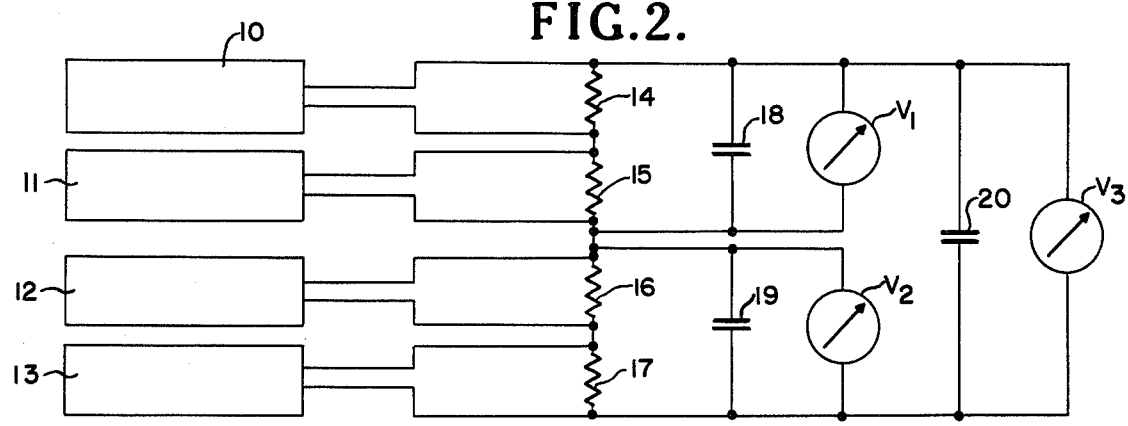
FIG. 2 is a diagram of a correlator.

In the foregoing discussion of the problem, the term correlation has been applied in a general sense, namely that of comparing two or more items having interrelated characteristics. When such a generalized concept is applied to the solution of the problem shown in FIG. 1, the difficulties of the local and ambient noises are introduced into this circuit. In the system of the present invention, therefore, signals from each of the transducers are simultaneously and separately amplified and clipped and compared with the clipped signal from one or both of the other transducers. Referring now to FIG. 2, if the signals from the transducers at H1 and at H3 are compared after they have been clipped by feeding the signals into correlators 10 and 11, the correlator 10 will put out a given voltage, for instance one volt, when the two transducers are receiving signals of the same polarity. If the signals received by correlator 10 are of opposite polarities this correlator will put out no voltage. If we also compare the signals from the transducers at H1 and at H3 after they have been clipped by feeding the signal into correlator 11, this correlator 11 is so arranged that when the signals are of the same polarity no signal is generated in the output circuit, whereas if the signals from the two transducers are of opposite polarity, a signal of the same predetermined voltage as was generated in the correlator 10, is generated in the output circuit of the correlator 11. The outputs of the correlators 10 and 11 may be added in opposition in the resistances 14 and 15 and the results applied to condenser 18 which functions to average the variations of the signals from the correlators 10 and 11 over a selected time. This time may be determined by the size of condenser 18 in combination with the resistance of its discharge path. Delay is introduced into the circuit of the transducer at H3 until the output of correlators 10 and 11 produces a maximum reading on the voltmeter V1 associated therewith. The reading of meter V1 will then be proportional to the percent of time there is agreement in polarity less percentage of time, there is disagreement in polarity of the signals averaged over some selected time interval.

Correlators 12 and 13 are arranged to compare the signals received from the three transducers at H1, H2 and H3 so that correlator 12 will produce an output of a predetermined voltage, for example one volt, when the polarity of all the signals received from H1, H2 and H3 are of the same polarity while correlator 13 is arranged so that it will, for example, produce an output of one volt when the signals received from the transducers at H1, H2 and H3 have a selected set of two similar polarities and one dissimilar polarity. Again the outputs from correlators 12 and 13 may be added in opposition in the resistance networks 16 and 17 and applied to averaging condenser 19 and voltmeter V2 as in the case of correlators 10 and 11. A delay is then introduced into the circuit of the transducer at H2 until the voltmeter V2 reads a maximum. The reading of meter V2 will then be proportional to the percent of time there is agreement in the polarities of the signals from all the transducers less the percent of times the selected set of two similar and one dissimilar polarities of the signals from the three transducers exists averaged over a selected time interval.

With the proper delays introduced into this circuit to maximize the readings of voltmeters V1 and V2, these voltmeter readings may be combined in a reading for a voltmeter V3. If V1 and V2 are placed in opposition, the reading on voltmeter V3 will be reduced to a minimum when the optimum adjustment of the position of transducers at H1, H2 and H3 is achieved.

Figure 3:
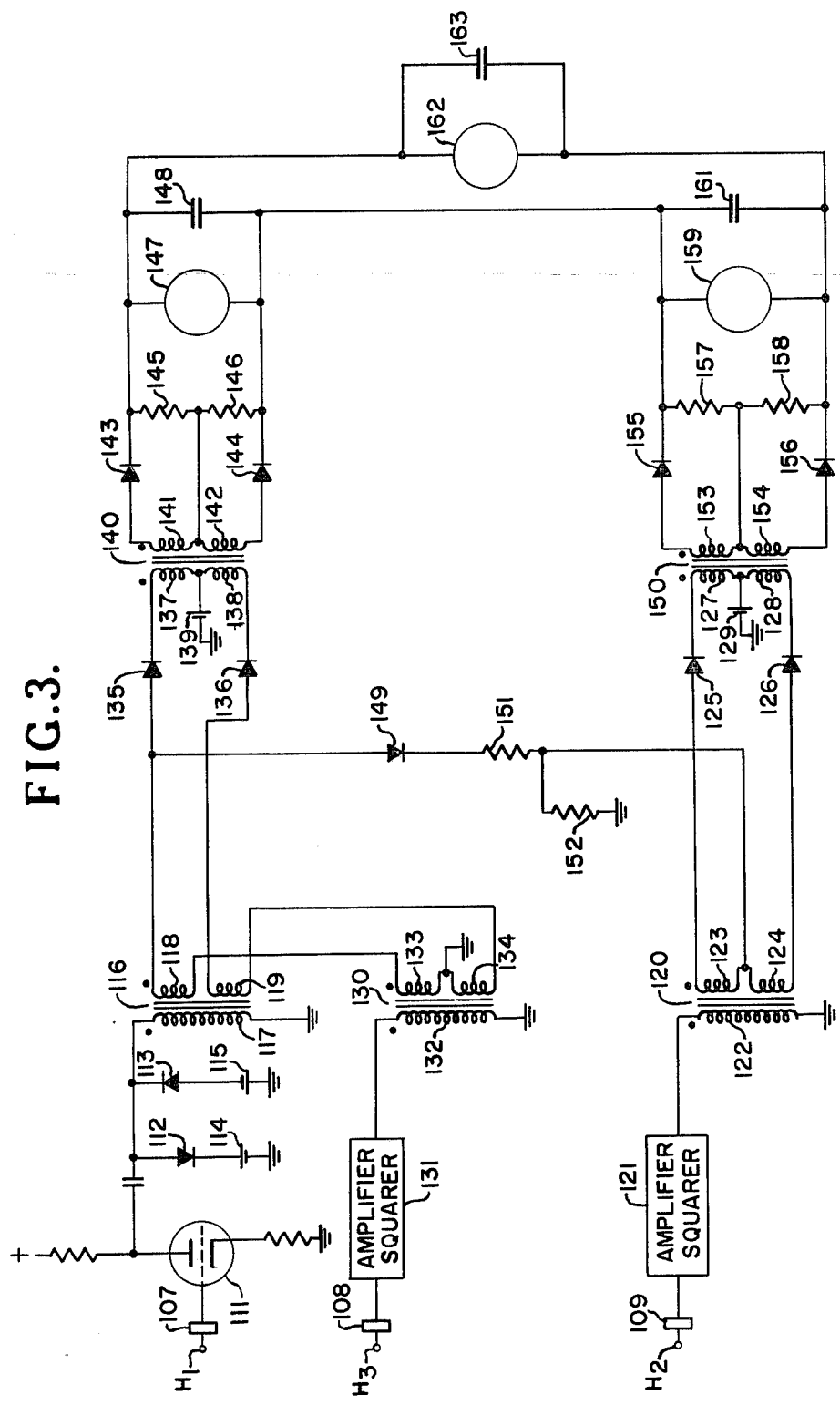
FIG. 3 is a circuit diagram of a correlator suitable for use with the system of the present invention.

In FIG. 3 there is shown a circuit diagram for solving the foregoing problems. This circuit shows the outputs of the transducers at H1, H2 and H3 fed into their respective amplifier and clipping circuits through adjustable delay means 107, 108 and 109 respectively. For purposes of illustration, this amplifying and clipping circuit is shown in FIG. 3 in detail for transducer at H1 and is shown only as a block for transducers at H2 and H3. This squaring and amplifying circuit may consist of an amplifying tube 111 whose output is fed to a pair of diodes 112 and 113, diodes 112 and 113 being biased by batteries 114 and 115 respectively to provide the clipping of the signals received from the amplifying tube 111. Diode 112 provides clipping for the positive half-cycle of the signals received while the diode 113 provides clipping for the negative half cycle of the signal received. A similar circuit is provided for the transducers at H2 and H3. Since each of the transducers will continuously receive a signal, a clipped signal will be continually applied to transformers 116, 120 and 130. These signals are applied to windings 117, 122 and 132 of transformers 116, 120 and 130 respectively. Since each of the transducers is simultaneously receiving noise signals, these signals appearing in transformers 116, 120 and 130 will have at any given instant similar or dissimilar polarities of the clipped noise signal, as the case may be. In implementing the correlation procedures in the present invention, it is only necessary to consider the one aspect of the signals in the correlation, namely their polarity aspect. This becomes significant in the system because the ambient and other noise signals received will have a random distribution of their polarities whereas the received signals from a particular source will have a preponderance of the same polarity when the transducers are positioned to receive signals in phase with the same wave front. Continuing the description of the circuit of FIG. 3, the split secondary windings 118 and 119 of transformer 116 are connected with winding 118 in series with a rectifier 135, winding 137 of transformer 140, biasing battery 139, and winding 133 of transformer 130 while winding 119 is connected in series with a rectifier 136, winding 138 of transformer 140, biasing battery 139 and winding 134 of transformer 130. The battery 139 functions to prevent stray back current from rectifiers 135 and 136 from flowing in the circuits. With these circuits, when the signal received by the transducers at H1 and H3 both have a positive polarity, a signal flows through winding 137 which induces a voltage in winding 141 and 142 to cause a current to flow through meter 147, the rectifier 143 and resistances 145 and 146 and the meter 147 and also stores a charge on condenser 148.

When the signals received at H1 and H3 are both negative, the rectifiers 135 and 136 block out the signal so that condenser 148 receives no additional voltage, and therefore the reading of meter 147 remains substantially unchanged since the discharge time constant of the circuit associated with condenser 148 is long in relation to the time between pulses of the signal.

When the signals received by the transducers at H1 and H3 are of different polarities, for example, if the signal at H1 is positive and the signal at H3 is negative the loop of the circuit containing windings 118 and 133 will have bucking voltages induced in winding 118 and 133 while the loop containing windings 119 and 134 will have voltages of the same polarity induced. When current flows in windings 119 and 134, the current induced to flow through the meter 147 is opposite in polarity to that flowing through meter 147 when the signals at both H1 and H3 are positive. The condenser 148 averages the polarities of the signals over a period of time and the meter 147 registers this average voltage to indicate the percentage time during which the polarity of the signals are positive less the percentage of time the polarities of the signals at H1 have positive and at H3 negative polarity. If the averaging period is sufficiently long this meter reading is related to the condition for reading the percentage time the signals are of like polarities less the percentage of time the signals are of different polarities by a factor of one half.

After the signals received by the transducers at H1 and H3 have been maximized for polarity correlation, the transducer at H2 is adjusted to a position such as H2″. The determination that transducer at H2 has reached the position H″2 is arrived at from a consideration of the remainder of the circuit of FIG. 3. The signals received by transducer at H2 are passed through the clipper-amplifier circuit 121 and applied to transformer winding 122 of transformer 120. This induces a voltage in windings 123 and 124. When the polarity of the signals from both the transducers at H1 and H3 is positive and the signal from the transducer at H2 is also positive, a current through resistor 151 is combined with the current resulting from the voltage in winding 123 and is caused to flow in the series circuit consisting of winding 123, rectifier 125, winding 127, battery 129 and resistor 152.

Since a signal current flows through windings 118 and 133 only when they are both positive, this establishes the condition that the signal at the transducer at H1 is in phase with the signal at H3. If then the signal appearing at the transducer at H2 is also positive, a signal current flowing in the circuit loop containing winding 123, rectifier 125, winding 127, biasing battery 129 and resistor 152 will have added to it current from windings 118 and 133. This flow of current induces a current in windings 153 and 154 of transformer 150 which causes a current to flow through meter 159 and charge condenser 161. When the signals from transducers at H1 and H3 have different polarities or are both negative no current flows through rectifier 149 and resistor 151. Under these conditions the battery 129 biases the circuits from the transducer at H2 so that no current flows in these circuits regardless of the polarity of the signal from the transducer at H2.

If, then, consideration is given to the condition that the signals from transducers at H1 and H3 are both positive and the signal from the transducer at H2 is negative the voltage through rectifier 149 and resistance 151 opposes the flow of current through winding 123 but adds to the current flowing through winding 124. Since, when current flows through winding 124, the current induced in the circuit of meter 159 is of opposite polarity from that induced when all three transducers have a positive polarity, there is a tendency to discharge the condenser 161. Therefore, as in the case of meter 147 and condenser 148, the condenser 161 provides means for giving a meter reading which is proportional to the average of the time during which the signals are positive in polarity less the average of the time during which two of the signals are positive and one is negative in polarity. It will be noted that rectifiers 125 and 126 perform similar functions to rectifiers 135 and 136 while rectifier 149 functions to prevent the currents in winding 123 from influencing the circuit of winding 118.

As was the case in the circuit of meter 147, the voltage induced in the circuit when the signals from windings 118 and 128 are alike and those induced in the circuit when the signal from the transducer at H2 is of different polarity from the signal from the transducers at H1 and H3 combined are averaged by condenser 161 and indicated on meter 159. The averaged signals from the two meters may be brought to a third meter and minimized to indicate that the transducers at H1, H2 and H3 all lie on the same wave front.

In the foregoing description it will be noted that the sets of polarities selected eliminate approximately half of the radiation signals received since the system described processes the signal only half the time during which the signals are all similar and only approximately half the time during which the signals are similar from the extreme transducer and dissimilar from the intermediate transducer. It would obviously be possible to utilize all the characteristics of the signal received by the system by adding similar circuits which had the rectifiers oriented to produce meter readings when all transducer signals are negative and when two are negative and one is positive.

The selection of the sets of polarities was based upon optimizing the functioning of the system. For the particular application for which the system was designed, the set was chosen in which the polarities were all the same or the polarities of the extreme transducers were the same with the intermediate transducer of a different polarity.

From a knowledge of the amount of the delays introduced into the circuits the bearing and range to the particular source may be determined and by calibrating these delays the bearing and range may be read directly.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A system for locating the position of an energy radiating source comprising three radiated energy receiving means arranged in predetermined substantially linear spaced positions and each producing an output signal in response to energy received thereby, a plurality of individual signal clipping means respectively connected to each of said receiving means for limiting the characteristics of said output signal therefrom to the instantaneous polarity of said signal, means connected to the respective signal clipping means for effecting polarity correlation between the clipped output signals of a predetermined pair of signal receiving means, electrical means serially connected between said receiving means and said correlation means for selectively introducing a delay of the signal from at least one signal receiving means sufficient to maximize the polarity correlation of said signals, said electrical delay means being calibrated to give the bearing to said source, a second means for effecting polarity correlation, the third energy receiving means being positioned intermediate and in aligned spaced relation to said predetermined pair of energy receiving means when the signals of said pair are in maximum polarity correlation, an additional electrical delay means connected between the third receiving means and said second means for maximizing polarity correlation between the clipped signals from the three receiving means, said additional electrical delay means being calibrated to indicate the range to said source when the clipped signals of said three receiving means are in maximum polarity correlation.

* * * * *